Patented May 15, 1934

1,958,710

UNITED STATES PATENT OFFICE 1,958,710

COLLOIDAL ALUMINUM HYDROXIDE AND METHOD OF MAKING THE SAME

Paul S. Moyer, Lake Forest, Ill.

No Drawing. Application March 23, 1933,
Serial No. 662,229

9 Claims. (Cl. 23—141)

The present invention relates to a novel type of aluminum hydroxide having pronounced colloidal properties, and to the process of producing the same.

One of the objects of the invention is to form aluminum hydroxide in suspension in the presence of an activating agent which allows the ready filtration of the product, so that it may be separated to some extent from the mother liquor from which it is precipitated, and which will allow the washing therefrom of impurities resulting from the reaction by which it is formed.

A further object of the invention is the preparation of aluminum hydroxide from sodium aluminate and a soluble aluminum salt.

A further object of the invention is to form aluminum hydroxide in colloidal form by interaction between sodium aluminate and a soluble aluminum salt, and thereupon treating the product precipitated by the reaction with an alkaline earth hydroxide, preferably calcium hydroxide, which greatly enhances the filterability of the precipitated colloidal aluminum hydroxide.

Further objects of the invention will appear from the detailed description and claims hereinbelow.

The fundamental principle involved in the present invention is the production of aluminum hydroxide from two reagents, both of which contain aluminum as a component; one of them carrying the aluminum as an acid radical and the other as a metallic ion. Thus, in the final product, the only other material formed will be a salt, which is readily removed from the precipitated aluminum hydroxide by washing. In this respect the present invention differs essentially from the hitherto employed means for the production of aluminum hydroxide, for in the past the process of preparing this material has usually been predicated upon the precipitation of a soluble aluminum salt, such, for example, as aluminum sulfate with an alkali, such as sodium carbonate, ammonium hydroxide and the like. Aluminum hydroxide has, moreover, also been precipitated from sodium aluminate by the addition of an acid and by passing carbon dioxide gas into the aluminate solution. The present invention, however, obtains aluminum hydroxide from both the soluble aluminate and a soluble aluminum salt. Thus the greatest possible economy is secured, and the production of the aluminum hydroxide is rendered both simple and inexpensive. Furthermore, the colloidal properties of the resultant aluminum hydroxide gel are much more pronounced, as in many cases aluminum hydroxide precipitated from an aluminum salt by means of alkalies is not at all colloidal nor gelatinous.

In its preferred embodiment, the present invention depends upon the reaction between sodium aluminate and aluminum sulfate. For example, in producing the aluminum hydroxide, one proceeds by dissolving in one vessel 10 lbs. of aluminum sulfate ($Al_2(SO_4)_3.18H_2O$), in 48 gallons of water, and in another vessel 16 lbs. of a sodium aluminate solution in 48 gallons of water. The said sodium aluminate solution is a commercial product, produced by the National Aluminate Corporation, of Chicago, Illinois, consisting of an aqueous solution of sodium meta-aluminate, $Na_2Al_2O_4$, containing a slight excess of sodium hydroxide, the composition of said solution being substantially 32% $Na_2Al_2O_4$, 8% NaOH and the balance water. Whenever sodium aluminate is mentioned in the present application, this type of sodium aluminate is understood as being the preferred form. However, an equivalent amount of dry sodium aluminate dissolved in water may be used. The two solutions prepared as above, are mixed with each other, it being immaterial as to which is poured into which. After the mixing has taken place, and as soon thereafter as convenient, 0.2185 lbs. of calcium hydroxide, $Ca(OH)_2$, made into a slurry with about two gallons of water, are stirred into the mixture of the two solutions, whereupon the entire mixture is allowed to remain quiescent for a period of from six to twelve hours.

In order to avoid contamination of the product and its discoloration by iron salts, it is preferred that the reaction take place in wooden containers, or, still more preferable, in tanks having a vitreous or glass-like lining.

After the mixture is allowed to stand for from six to twelve hours, it will be found that it consists of a jelly-like mass of colloidal aluminum hydroxide which can readily be filtered as, for example, on a rotary filter of the type known as the "Oliver", in or upon which filter the colloidal precipitated aluminum hydroxide is washed with water to remove the soluble salts formed, which in the present case will be sodium sulfate. The above proportions will yield about 120 lbs. of the aluminum hydroxide gel, containing from 4 to 10% of solids.

The reaction that takes place is one of metathesis, the aluminum from the aluminum sulfate, as well as from the sodium aluminate appearing as aluminum hydroxide in the product, the only other product being sodium sulfate and the slight amount of sodium hydroxide which remains unchanged.

It has been found advisable, although not strictly essential, to control the hydrogen ion concentration of the precipitated mass so that it will be slightly on the alkaline side, say, between pH 7.5 and 9.0, and for the best results at approximately pH 8.0.

It is not known at the present time just what the effect of the calcium hydroxide is, but it has been proved by experiment and large-scale operations that the calcium hydroxide has a tremendous effect upon the filterability of the precipitated colloidal aluminum hydroxide, for in the absence of the calcium hydroxide the aluminum hydroxide precipitated is so difficult to filter as to render its purification and the removal therefrom of the formed soluble salts almost impossible. Therefore, a great step of advancement has been made in the present process by the use of the calcium hydroxide. Whether this material plays a part in the reaction itself has not been definitely established, but the fact remains that it greatly enhances the colloidal properties as well as the filterability of the desired end product.

Experiments have shown that strontium hydroxide and barium hydroxide may be substituted for the calcium hydroxide, but the results will be very mediocre. Calcium almuinate is also effective in modifying the filterability of the aluminum hydroxide but by no means to as great an extent as calcium hydroxide. Barium aluminate is practically ineffective for the purpose.

It has also been discovered that the use of sodium carbonate, sodium hydroxide, or ammonium hydroxide as precipitants for aluminum hydroxide from aluminum is not effective for producing a filterable aluminum hydroxide which can be purified by washing, and therefore aluminum hydroxide made by such precipitation does not fall within the scope of the present invention. Such aluminum hydroxide precipitated from aluminum sulfate by the just enumerated alkalies is pasty and very difficult to filter.

The aluminum hydroxide in its colloidal form, after being washed, will be found to contain as little as 1% of sodium sulfate, and, despite the fact that it may contain as high as 96% of water, appears in the form of a substantially solid substance which can be packed in waxed wooden or waxed cardboard containers without much absorption of water by the container.

The colloidal aluminum hydroxide prepared in accordance with the present invention is a very valuable substance and lends itself particularly to the manufacture of printing inks, for the coating and sizing of paper as a substitute for satin-white—which it greatly exceeds in value from a paper-coating standpoint—and to any other use where a colloidal aluminum hydroxide may be indicated for employment in the arts.

The fundamental concept of the present invention, therefore, comprises the employment of an activating agent to enhance the free filtering qualities of an aluminum hydroxide precipitated from a solution containing an aluminum ion, as contra-distinguished from aluminum hydroxide made by metathesis without the use of such activating agent.

In the hereunto appended claims, the term "activating agent" is understood to cover such compounds as calcium hydroxide, strontium hydroxide, barium hydroxide, calcium aluminate, and their chemical equivalents.

What it is desired to protect by Letters Patent is as follows:

1. A colloidal precipitated aluminum hydroxide characterized by its gelatinous nature and containing from 4% to 10% of total solids, being in the form of a gelatinous solid having high absorptive qualities.

2. Aluminum hydroxide in gelatinous colloidal form containing small amounts of a substance from the group consisting of calcium, strontium and barium hydroxides and calcium aluminate.

3. The process of producing colloidal readily filterable aluminum hydroxide which comprises mixing solutions of sodium aluminate and a soluble aluminum salt to form aluminum hydroxide and mixing said aluminum hydroxide in solution with a substance selected from the group consisting of calcium hydroxide, strontium hydroxide, barium hydroxide and calcium aluminate.

4. The process of producing colloidal readily filterable precipitated aluminum hydroxide which comprises mixing a solution of sodium aluminate with a solution of aluminum sulphate to form precipitated aluminum hydroxide and adding to said precipitated aluminum hydroxide a suspension of calcium hydroxide, and filtering the resultant insoluble product.

5. The process of producing colloidal readily filterable precipitated aluminum hydroxide which comprises mixing a solution of sodium aluminate with a solution of aluminum sulphate to form precipitated aluminum hydroxide and adding to said precipitated aluminum hydroxide a suspension of calcium hydroxide, filtering the resultant insoluble product and washing the same.

6. The process of producing colloidal readily filterable aluminum hydroxide which comprises mixing solutions of sodium aluminate, aluminum sulphate and a suspension of calcium hydroxide, allowing interaction between the enumerated substances to take place, whereby aluminum hydroxide is precipitated in filterable form, and filtering said precipitate and washing the same.

7. The process of producing colloidal aluminum hydroxide which comprises dissolving aluminum sulphate and sodium aluminate in separate quantities of water, suspending calcium hydroxide in a third separate quantity of water, mixing the solutions of sodium aluminate and aluminum sulphate, thereupon adding the suspension of calcium hydroxide, allowing the resulting mixture to stand quiescent for a period of from 6 to 12 hours, and thereafter filtering the resulting precipitate and washing the same.

8. A colloidal precipitated aluminum hydroxide gel containing from 4% to 10% of total solids, being in the form of a gelatinous solid having high absorptive qualities, and containing a small amount of a substance from the group consisting of calcium, strontium and barium hydroxides and calcium aluminate.

9. A colloidal precipitated aluminum hydroxide gel containing from 4% to 10% of total solids, being in the form of a gelatinous solid having high absorptive qualities, and containing a small amount of calcium hydroxide.

PAUL S. MOYER.